(12) United States Patent
Huang

(10) Patent No.: US 7,701,697 B2
(45) Date of Patent: Apr. 20, 2010

(54) STRUCTURE OF SUPERCAPACITOR

(75) Inventor: Yung Sheng Huang, Taipei County (TW)

(73) Assignee: CTech Corporation, Taipei County (TW)

(*) Notice: Subject to any disclaimer, the term of this patent is extended or adjusted under 35 U.S.C. 154(b) by 0 days.

(21) Appl. No.: 12/285,966

(22) Filed: Oct. 17, 2008

(65) Prior Publication Data

US 2009/0046413 A1 Feb. 19, 2009

Related U.S. Application Data

(62) Division of application No. 11/698,139, filed on Jan. 26, 2007.

(30) Foreign Application Priority Data

Dec. 4, 2006 (TW) .............................. 95145001 A

(51) Int. Cl.
*H01G 9/00* (2006.01)
(52) U.S. Cl. ..................................... 361/502; 29/25.03
(58) Field of Classification Search ............... 361/301.4, 361/502, 517, 518, 523, 524, 525, 526, 527, 361/528, 535, 536; 29/25.01, 25.02, 25.03, 29/25.41, 623.5
See application file for complete search history.

(56) References Cited

U.S. PATENT DOCUMENTS

| | | | | |
|---|---|---|---|---|
| 5,065,286 A | * | 11/1991 | Kurabayashi et al. | 361/502 |
| 5,303,118 A | * | 4/1994 | Saito et al. | 361/502 |
| 5,464,453 A | * | 11/1995 | Tong et al. | 29/25.03 |
| 6,324,049 B1 | * | 11/2001 | Inagawa et al. | 361/502 |
| 6,440,179 B1 | * | 8/2002 | Yang et al. | 29/25.03 |
| 2006/0044736 A1 | * | 3/2006 | Taketani et al. | 361/523 |

* cited by examiner

*Primary Examiner*—Eric Thomas
*Assistant Examiner*—David M Sinclair
(74) *Attorney, Agent, or Firm*—Rosenberg, Klein & Lee

(57) ABSTRACT

The method for manufacturing a supercapacitor according to the present invention includes the following steps. First, stack a bottom electrode plate and a top electrode plate in parallel. Then, install a first rubber frame and a second rubber frame face-to-face on the bottom and the top electrode plates. The first rubber frame is adapted with a first opening, while the second rubber frame is adapted with a second opening. Next, install an isolation membrane in a space surrounded by the first and the second rubber frames. Afterwards, bind the first and the second rubber frames. Then, produce vacuum in the space. Next, place the bottom and the top electrode plates into an electrolyte to make the electrolyte flow into the space. Finally, use a first resin to seal the first and the second openings. Thereby, the short-circuit phenomenon caused by long-term usage of the supercapacitor can be prevented. In addition, the structural strength of the supercapacitor can be reinforced to avoid electrolyte-leakage phenomenon.

14 Claims, 9 Drawing Sheets

US 7,701,697 B2

STRUCTURE OF SUPERCAPACITOR

RELATED APPLICATION

The application is a Divisional patent application of co-pending application Ser. No. 11/698,139, filed on 26 Jan. 2007.

FIELD OF THE INVENTION

The present invention relates generally to a structure of a supercapacitor and a method for manufacturing the same, which can prevent short circuit and electrolyte leakage in a supercapacitor after long-term usage.

BACKGROUND OF THE INVENTION

FIG. 7 shows a structural schematic diagram of a supercapacitor according to the prior art. As shown in the figure, the supercapacitor according to the prior art includes a plurality of electrode plates 92 with each electrode plate 92 stacked on each other in parallel. A pad ring 94 is adapted on each of the electrode plate 92, and pad rings 94 of adjacent electrode plates 92 bind to each other such that a gap 95 is formed therebetween. The gap 95 is filled with an electrolyte 96.

When the supercapacitor according to the prior art charges or discharges, the electrolyte 96 will produce thermal expansion. Hence, the gap 95 will be jostled open by the electrolyte 96. If the pad ring 94 is an elastic part, thermal expansion of the electrolyte 96 will be eased. However, after long-term usage, the pad ring 94 will deteriorate owing to the heat generated by charging and discharging of the supercapacitor. Consequently, the pad rings 94 of adjacent electrode plates 92 cannot bind to each other, which will result in leakage of the electrolyte 96 from the gap 95. In addition, it will cause adjacent electrode plates 92 to contact with each other and hence a short circuit results. Thereby, normal operation of the supercapacitor is affected.

Consequently, the present invention provides a structure of a supercapacitor and a method for manufacturing the same, which can prevent short circuit and in a supercapacitor after long-term usage, and can enhance structural strength of a supercapacitor for avoiding electrolyte leakage.

SUMMARY

An objective of the present invention is to provides a structure of a supercapacitor and a method for manufacturing the same, which adapts a first rubber frame and a second rubber frame on a bottom electrode plate and a top electrode plate, respectively. In addition, an isolation membrane is adapted in a space surrounded by the first and the second rubber frames. Thereby, the short-circuit phenomenon caused by contact of the bottom and the top electrode plates after long-term usage of the supercapacitor can be prevented. Hence, the lifetime of the supercapacitor can be increased.

Another objective of the present invention is to provides a structure of a supercapacitor and a method for manufacturing the same, which, by stuffing a second resin between the bottom and the top electrode plates and outside the first and the second rubber frames, the structural strength of the supercapacitor according to the present invention can be enhanced, and thereby electrolyte-leakage phenomenon can be prevented.

A further objective of the present invention is to provides a structure of a supercapacitor and a method for manufacturing the same, which, by adapting the first and the second rubber frames on the bottom and the top electrode plates, when the supercapacitor charges or discharges, expansion of electrolyte is eased, and thereby lifetime of the supercapacitor is increased.

The method for manufacturing a supercapacitor according to the present invention includes the following steps. First, stack a bottom electrode plate and a top electrode plate, and make them parallel to each other. Then, install a first rubber frame and a second rubber frame on the bottom and the top electrode plates, wherein a first opening is adapted in the first rubber frame, and a second opening is adapted in the second rubber frame, and the first and the second rubber frames face each other. Next, install an isolation membrane in a space surrounded by the first and the second rubber frames. Afterwards, heat the bottom and the top electrode plates to bind the first and the second rubber frames. After that, produce vacuum in the space. Then, place the bottom and the top electrode plates in an electrolyte to make the electrolyte flow into the space. Finally, use a first resin to seal the first and the second openings. After the step of using the first resin to seal the openings, stuff a second resin between the bottom and the top electrode plates and outside the first and the second rubber frames.

The structure of a supercapacitor according to the present invention includes a bottom electrode plate, a top electrode plate, an isolation membrane, and an electrolyte. The bottom and the top electrode plates parallel with and stack on each other. A first rubber frame is adapted atop the bottom electrode plate, while a second rubber frame is adapted below the top electrode plate. The first and the second rubber frames bind with each other. The isolation membrane is adapted between the top and the bottom electrode plates, and is located in a space surrounded by the first and the second rubber frames. The electrolyte is filled in the space. In addition, a second resin is adapted between the bottom and the top electrode plates and outside the first and the second rubber frames.

By installing the membrane in the space, the short-circuit phenomenon after long-term usage of the supercapacitor can be prevented. By stuffing the second resin between the bottom and the top electrode plates, the structural strength of a supercapacitor is enhanced for avoiding electrolyte leakage. Hence, the lifetime of the supercapacitor can be increased.

DETAILED DESCRIPTION

In order to make the structure and characteristics as well as the effectiveness of the present invention to be further understood and recognized, the detailed description of the present invention is provided as follows along with preferred embodiments and accompanying figures.

Figure 1:
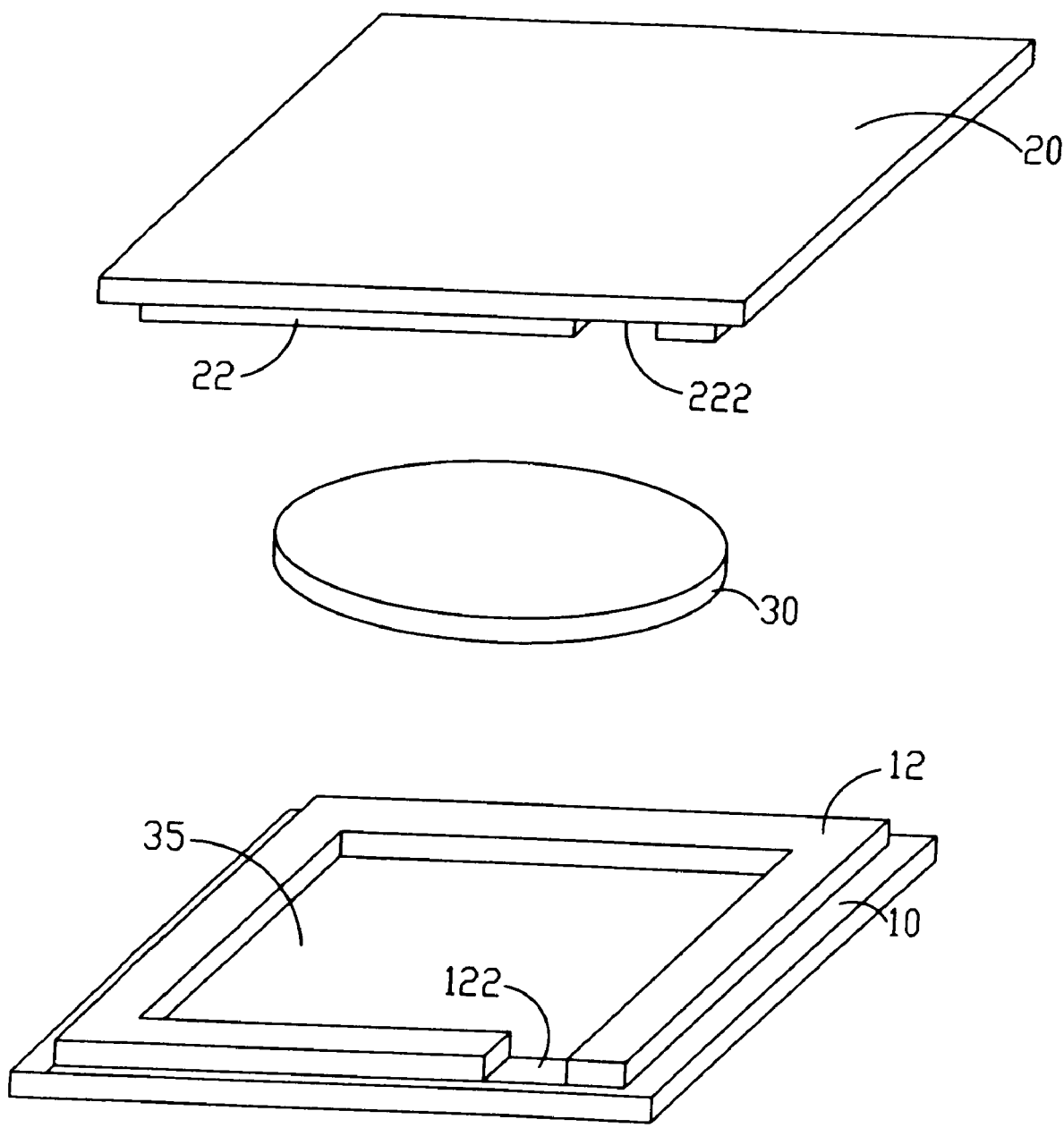
FIG. 1 shows a three-dimensional view of a supercapacitor according to a preferred embodiment of the present invention.
Figure 2A:
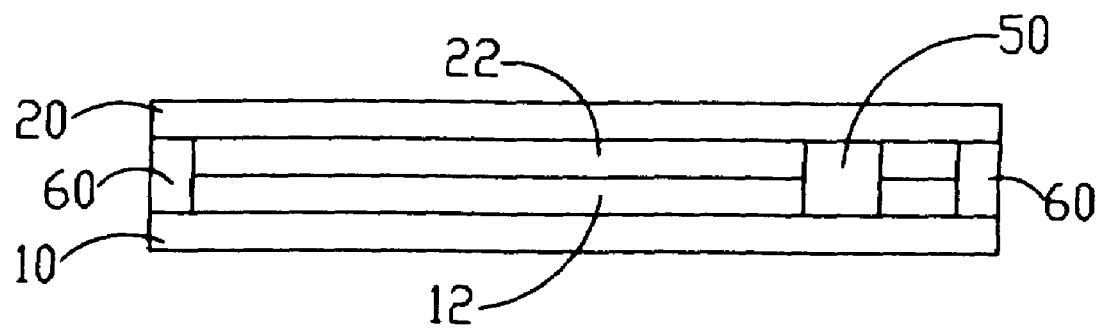
FIG. 2A shows a side view of a supercapacitor according to a preferred embodiment of the present invention.
Figure 2B:
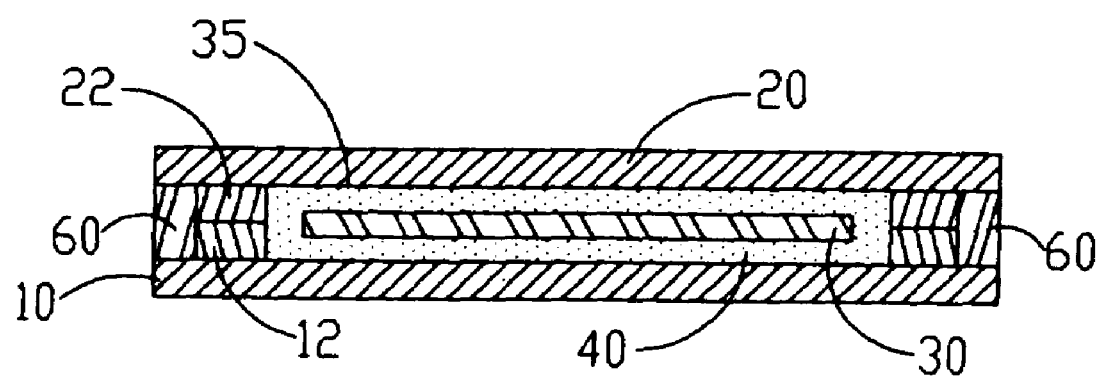
FIG. 2B shows another side view from another direction of a supercapacitor according to a preferred embodiment of the present invention.

FIGS. 1, 2A, and 2B show a three-dimensional view, a side view, and another side view from another direction, respectively, of a supercapacitor according to a preferred embodiment of the present invention. As shown in the figures, the structure of a supercapacitor according to the present invention includes a bottom electrode plate 10, a top electrode plate 20, an isolation membrane 30, and an electrolyte 40. The bottom and the top electrode plates 10, 20 parallel with and stack on each other. A first rubber frame 12 is adapted atop the bottom electrode plate 10, while a second rubber frame 22 is adapted below the top electrode plate 20. The first and the second rubber frames 12, 22 bind with each other. The isolation membrane 30 is adapted between the top and the bottom electrode plates 20, 10, and is located in a space 35 surrounded by the first and the second rubber frames 12, 22. The electrolyte 40 is filled in the space 35.

When the supercapacitor is used for a long time, the first rubber frame 12 or the second rubber frame 22 will deteriorate owing to environmental factors, such as the heat produced during charging and discharging of the supercapacitor. Thereby, the first rubber frame 12 and the second rubber frame 22 cannot bind with each other any longer. As a result, the bottom electrode plate 10 and the top electrode plate 20 will contact with each other and cause a short circuit, affecting normal operations of the supercapacitor. Consequently, the isolation membrane 30 is adapted in the space 35 surrounded by the first and the second rubber frames 12, 22 for preventing contact of the bottom and the top electrode plates 10, 20. Thereby, lifetime of the supercapacitor can be increased.

The first rubber frame 12 is adapted with a first opening 122, while the second rubber frame 22 is adapted with a second opening 222. Thereby, it is convenient to fill the electrolyte 40 between the bottom electrode plate 10 and the top electrode plate 20. After the electrolyte is filled in the space 35, a first resin 50 is adapted in the first opening 122 and the second opening 222 for sealing the first and the second openings 122, 222. The material of the first and the second rubber frames 12, 22 includes elastic polymer materials, which include rubber or polybutadiene. Because the material of the first rubber frame 12 and the second rubber frame 22 is an elastic polymer material, when the supercapacitor charges or discharges, volume expansion of the electrolyte 40 can be eased, and lifetime of the supercapacitor can be increased.

The supercapacitor according to the present invention further includes a second resin 60, which includes epoxy resin. The second resin 60 is adapted between the bottom and the top electrode plates 10, 20, and is located outside the first and the second rubber frames 12, 22. By means of the second resin 60, the structural strength of the supercapacitor according to the present invention is enhanced, and thereby electrolyte-leakage phenomenon can be prevented.

Figure 2C:
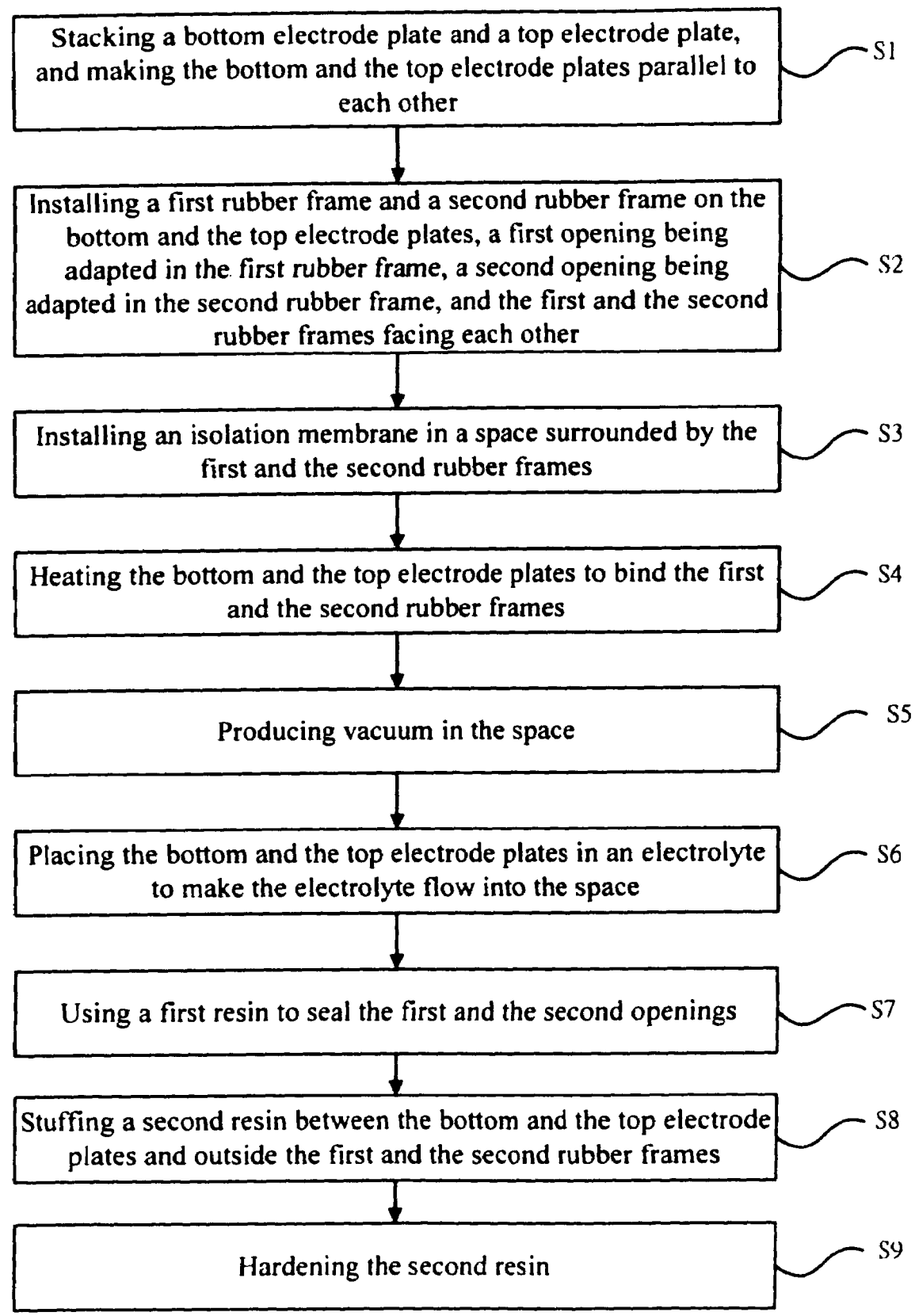
FIG. 2C shows a flowchart according to a preferred embodiment of the present invention.

FIG. 2C shows a flowchart according to a preferred embodiment of the present invention. As shown in the figure, a method for manufacturing a supercapacitor according to the present invention is described. First, the step S1 is execute for stacking a bottom electrode plate 10 and a top electrode plate 20, and making the bottom and the top electrode plates 10, 20 parallel to each other. Then, the step S2 is executed for installing a first rubber frame 12 and a second rubber frame 22 on the bottom and the top electrode plates 10, 20, wherein a first opening 122 is adapted in the first rubber frame 12, a second opening 222 is adapted in the second rubber frame 22, and the first and the second rubber frames 12, 22 face each other. The first and the second rubber frames 12, 22 are installed on the bottom and the top electrode plates 10, 20 by means of gluing, screen printing, or spraying. Next, the step S3 is performed for installing an isolation membrane 30 in a space 35 surrounded by the first and the second rubber frames 12, 22. Afterwards, the step S4 is executed for heating the bottom and the top electrode plates 10, 20 to bind the first and the second rubber frames 12, 22. To heat the bottom and the top electrode plates 10, 20, heating methods including contact heating by thermal resistors, hot-wind heating, or infrared heating can be applied. After that, the step S5 is performed for producing vacuum in the space 35.

Figure 3:
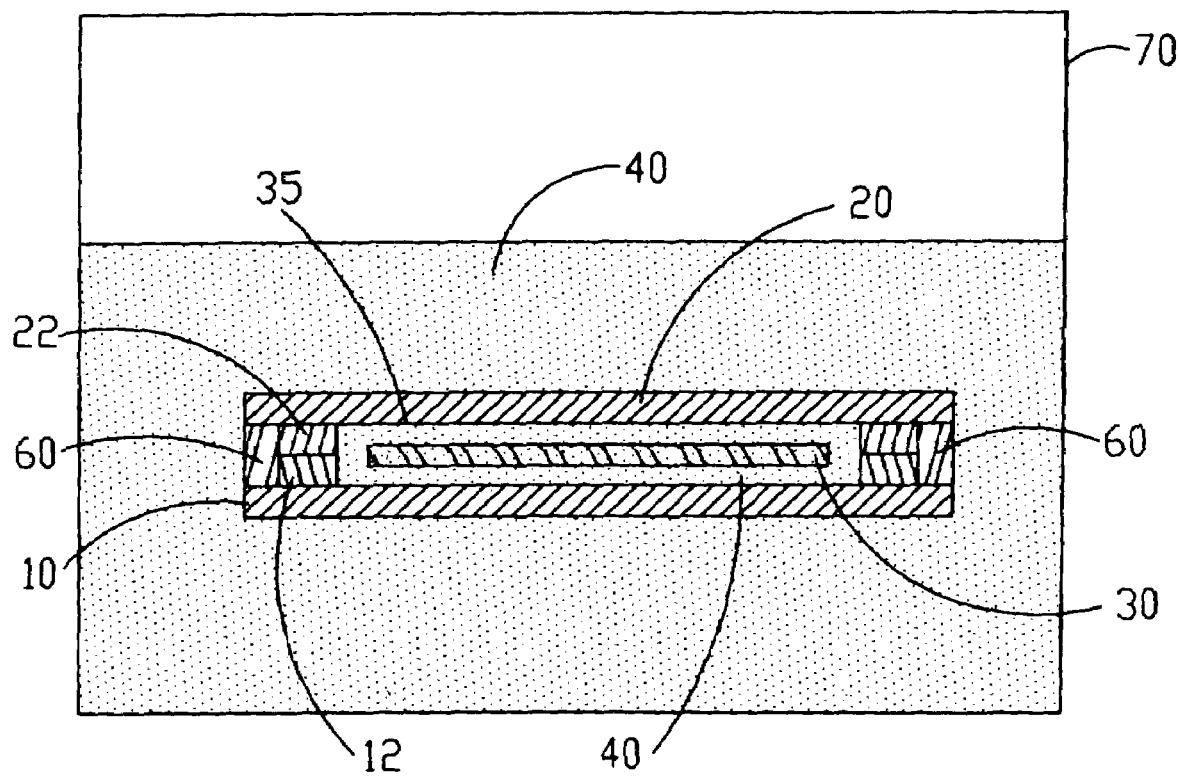
FIG. 3 shows a schematic diagram of a supercapacitor immersed in an electrolyte according to a preferred embodiment of the present invention.

FIG. 3 shows a schematic diagram of a supercapacitor immersed in an electrolyte 40 according to a preferred embodiment of the present invention. As shown in the figure, after the step of producing vacuum in the space 35, the step S6 is performed for placing the bottom and the top electrode plates 10, 20 in an electrolyte 40 to make the electrolyte 40 flow into the space 35. In order to fill the electrolyte 40 in the space 35, the bottom and the top electrode plates 10, 20 are placed in a container 70 containing the electrolyte 40. Then, the container 70 is vacuumed to make the air in the space 35 flow out. Thereby, the electrolyte can flow into the space 35. Afterwards, the step S7 is executed for using a first resin 50 to seal the first and the second openings 122, 222.

In order to reinforce the structural strength of the supercapacitor, after the step S7, the step S8 is executed for stuffing a second resin 60 between the bottom and the top electrode plates 10, 20 and outside the first and the second rubber frames 12, 22. Because the gap between the bottom and the top electrode plates 10, 20 is small, which is about 0.1 to 0.5 millimeters only, and the distance between the first rubber frame 12 and the bottom electrode plate 10, and the distance between the second rubber frame 22 and the top electrode plate 20 are between 1 to 3 millimeters, respectively, the second resin 60 can flow between the bottom and the top electrode plates 10, 20 by capillary actions, and thereby fill the whole outside of the supercapacitor. Then, the step, S 10 is performed for hardening the second resin 60. Place the supercapacitor with the second resin 2060 still for 12 to 24 hours, or heat it to 60 to 80 degrees Celsius, to harden the second resin 60.

Figure 4A:
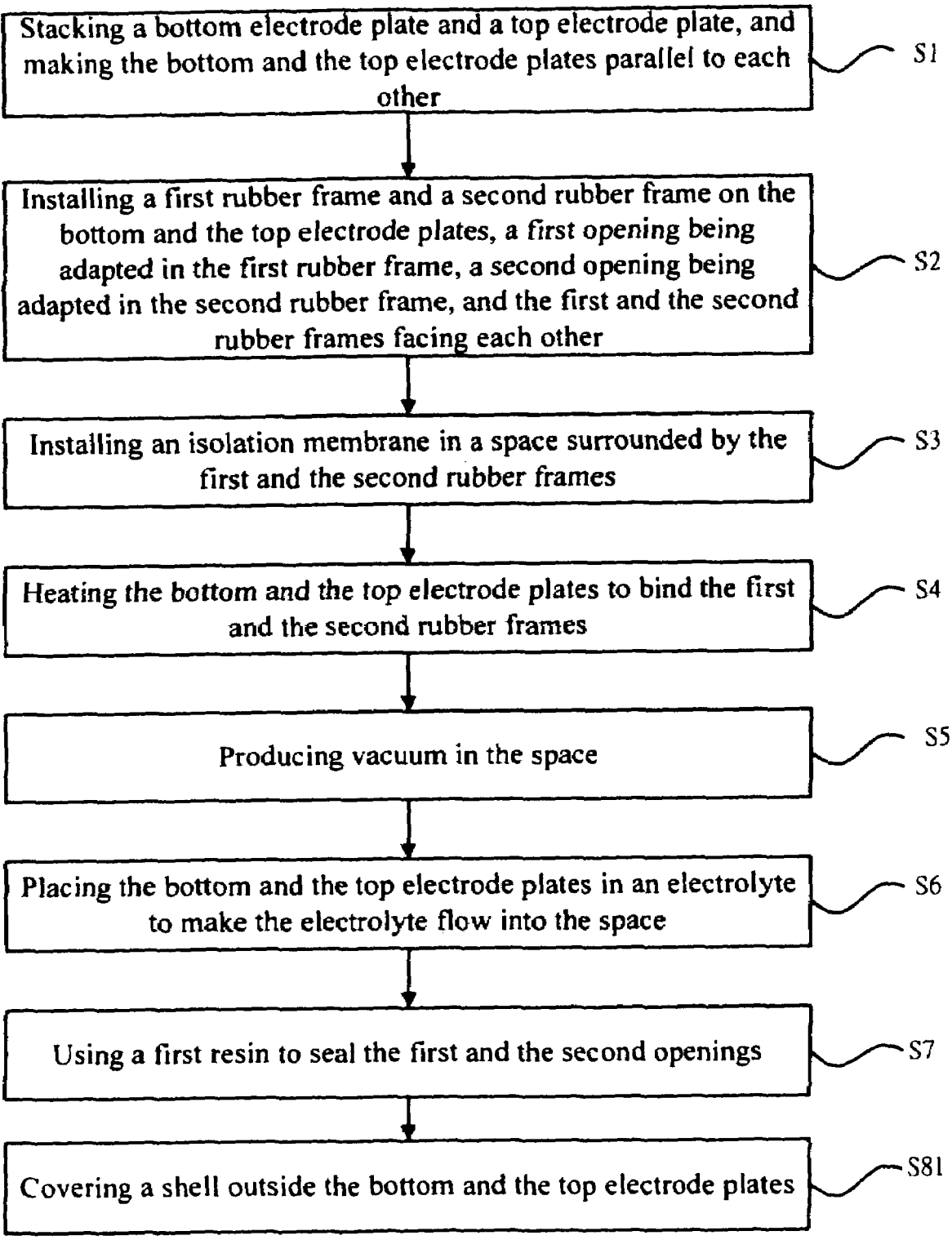
FIG. 4A shows a flowchart according to another preferred embodiment of the present invention.
Figure 4B:
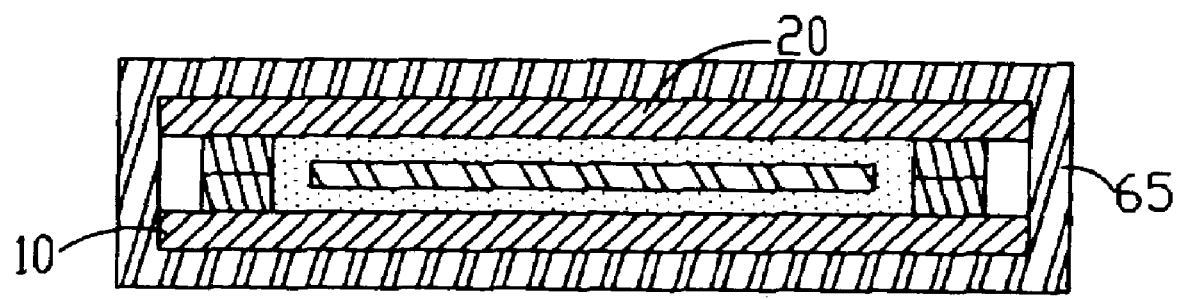
FIG. 4B shows a side view of a supercapacitor according to another preferred embodiment of the present invention.

FIGS. 4A and 4B show a flowchart and a side view according to another preferred embodiment of the present invention. As shown in the figures, the difference between the present embodiment from the previous one is that, in the previous embodiment, after the step S7, the step of stuffing a second resin 60 between the bottom and the top electrode plates 10, 20 and outside the first and the second rubber frames 12, 22 is performed. However, in the present embodiment, after the step S7, which uses a first resin 50 to seal the first and the second openings 122, 222, the step S81 is executed for covering a shell 65 outside the bottom and the top electrode plates 10, 20. The material of the shell 65 includes hard epoxy resin. By means of the shell 65, the structural strength of the supercapacitor is increased.

Figure 5A:
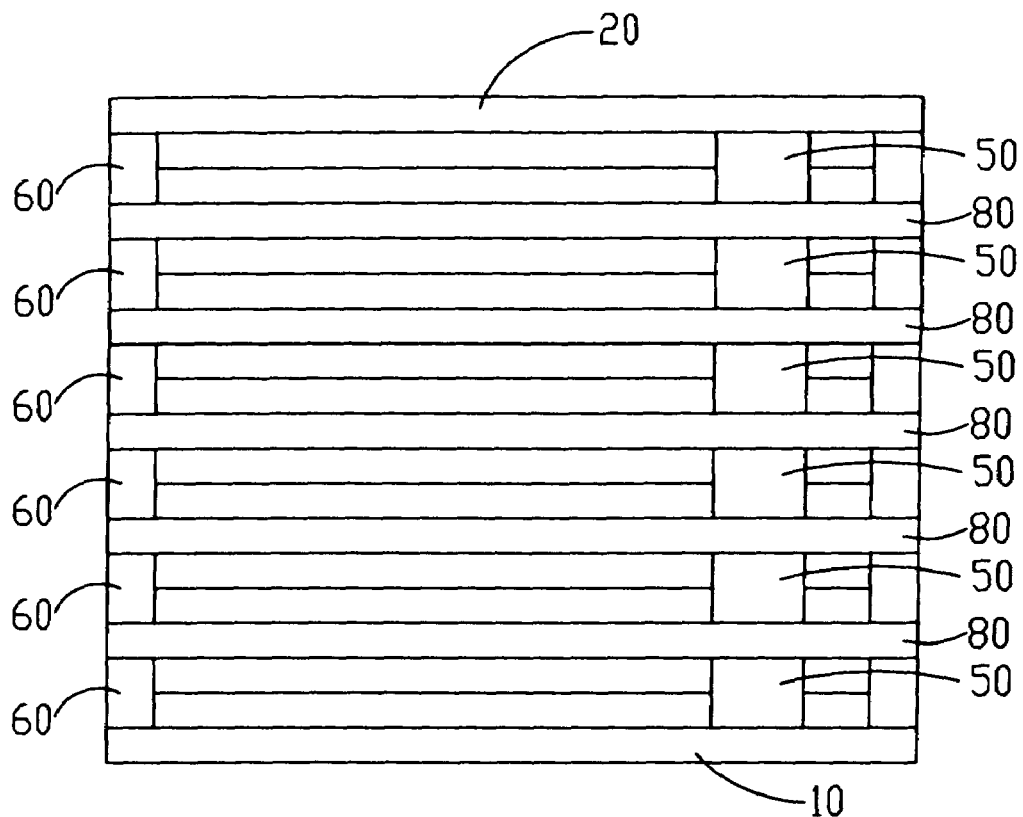
FIG. 5A shows a side view of a supercapacitor according to another preferred embodiment of the present invention.
Figure 5B:
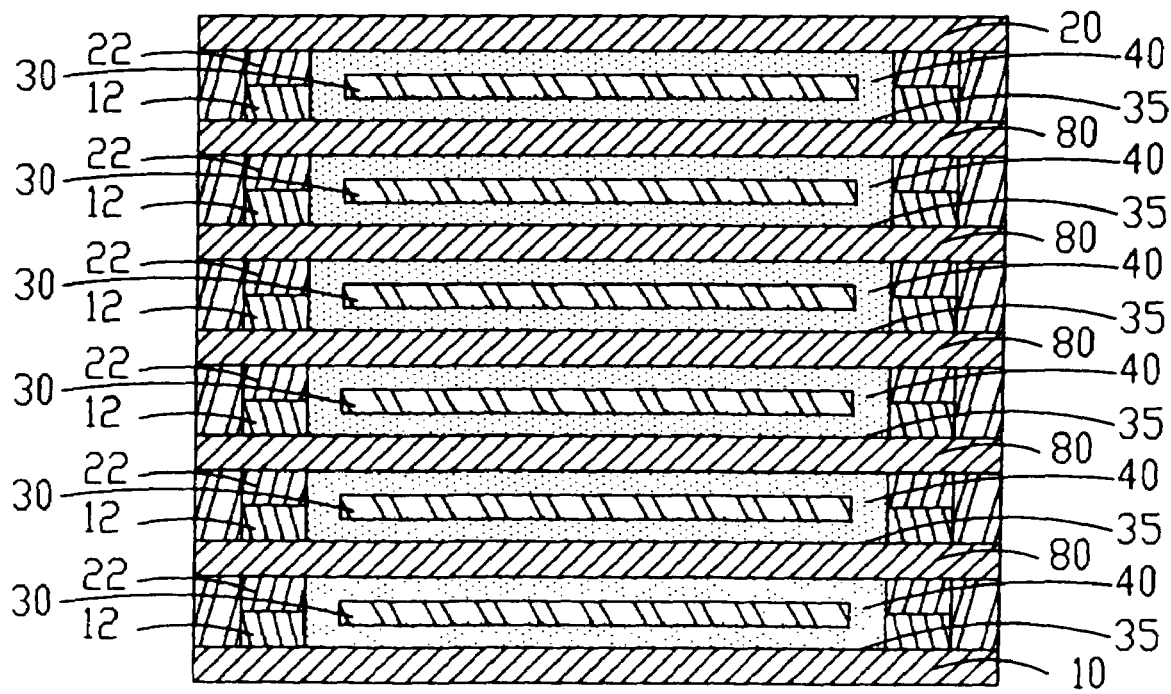
FIG. 5B shows another side view from another direction of a supercapacitor according to another preferred embodiment of the present invention.

FIGS. 5A and 5B show a side view and another side view from another direction of a supercapacitor, respectively, according to another preferred embodiment of the present invention. As shown in the figures, the difference between the present embodiment from the previous one is that, in the present embodiment, a plurality of electrode plates parallels with and stacks on each other. The plurality of electrode plates includes a bottom electrode plate 10, a plurality of middle electrode plates 80, and a top electrode plate 20. Atop the bottom electrode plate 10 and the middle electrode plates 80, first rubber frames 12 are adapted, respectively. Below the top electrode plate 20 and the middle electrode plates 80, second rubber frames 22 are adapted, respectively. The first rubber frames 12 and the second rubber frames 22 of adjacent electrode plates bind to each other such that spaces 35 are surrounded by the first and the second rubber frames 12, 22. In each of the spaces 35, an isolation membrane 30 is adapted, and an electrolyte 40 is filled within. In addition, second resins 60 are adapted between adjacent electrode plates and outside the first and the second rubber frames 12, 22.

Figure 6:
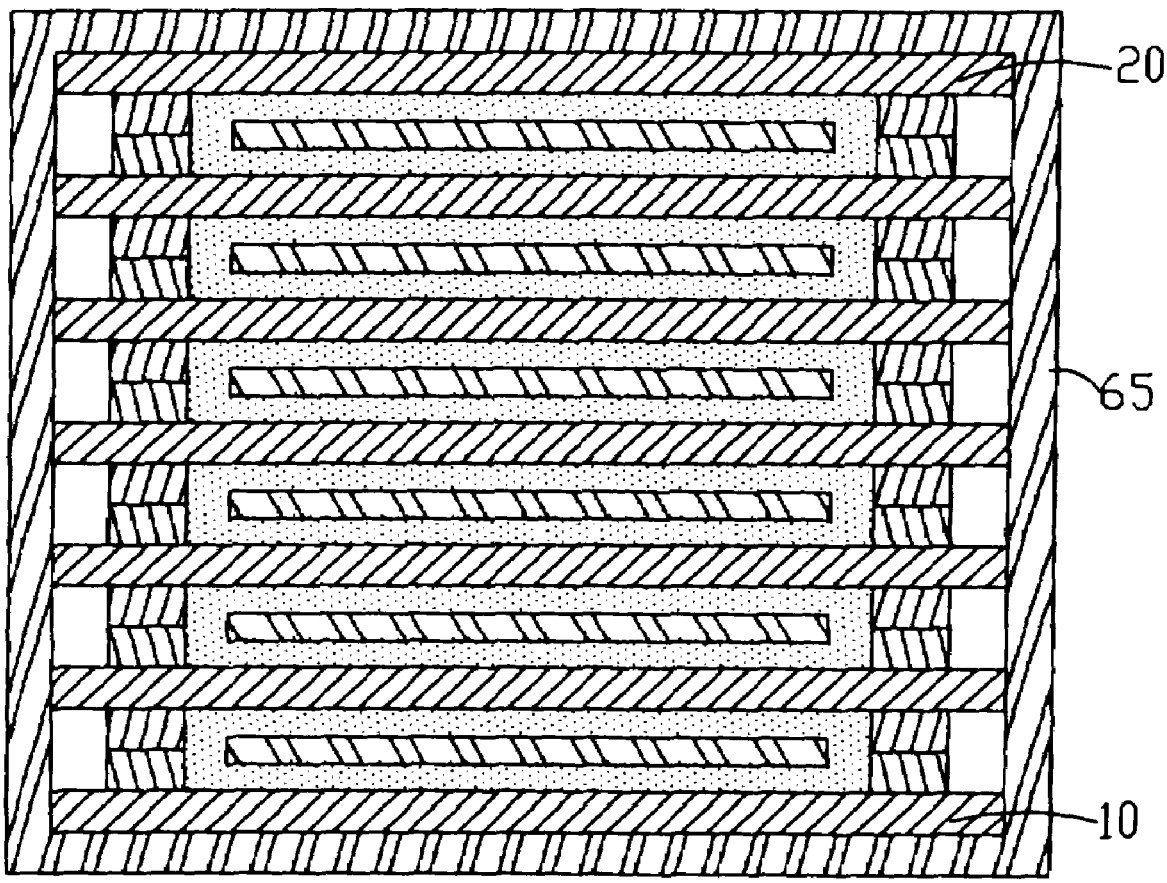
FIG. 6 shows a side view of a supercapacitor according to another preferred embodiment of the present invention.
Figure 7:
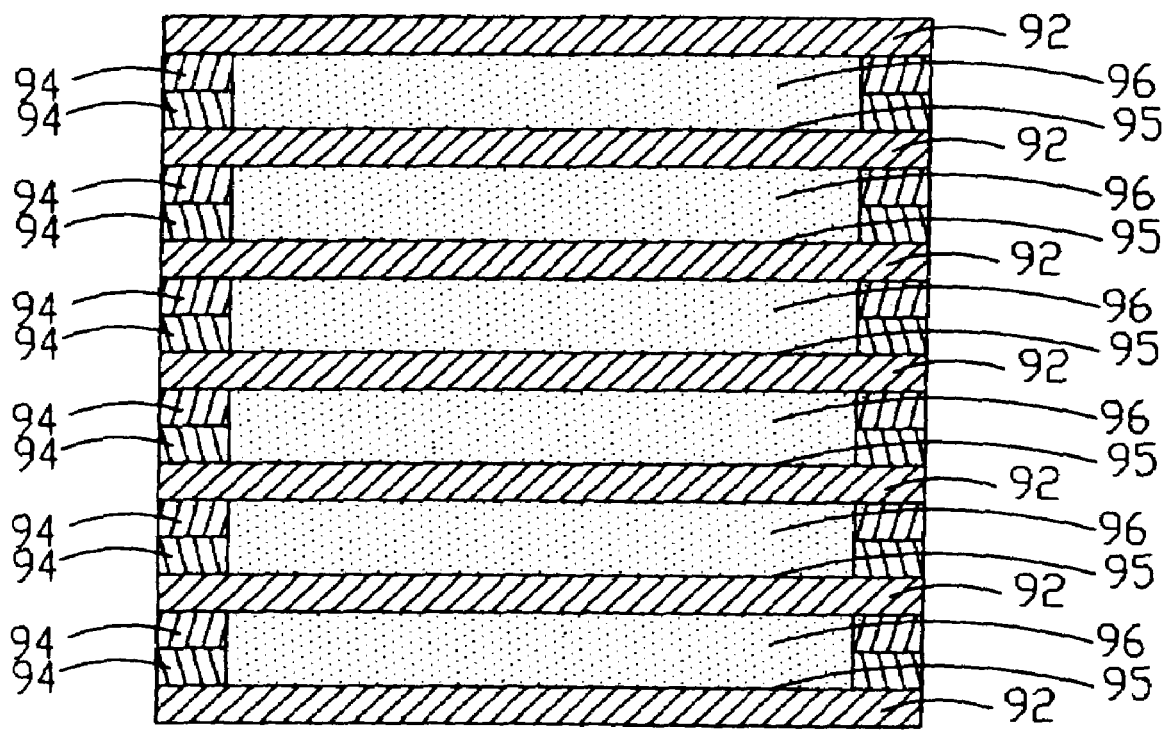
FIG. 7 shows a side view of a supercapacitor according to the prior art.

FIG. 6 shows a side view of a supercapacitor according to another preferred embodiment of the present invention. As shown in the figure, the difference between the present embodiment from the previous one is that, in the present embodiment, the second resins 60 between adjacent electrode plates are not installed. In the present embodiment, a shell 65 is covered outside the bottom and the top electrode plates 10, 20. The material of the shell 65 includes hard epoxy resin. By means if the shell 65, the structural strength of the supercapacitor is reinforced.

To sum up, the method for manufacturing a supercapacitor according to the present invention includes the following steps. First, stack the bottom and the top electrode plate in parallel, and install the first and the second rubber frames face-to-face on the bottom and the top electrode plates, respectively. Then, install an isolation membrane in the space surrounded by the first and the second rubber frames, and bind the first and the second rubber frames. Next, produce vacuum in the space, and place the bottom and the top electrode plates into the electrolyte. Finally, use the first resin to seal the first and the second openings, and install the second resin outside the first and the second rubber frames. Thereby, the structural strength of the supercapacitor according to the present invention can be reinforced, and electrolyte expansion phenomenon when the supercapacitor charges or discharges can be eased. In addition, contact of the bottom and the top electrode plates can be avoided. Hence, lifetime of the supercapacitor can be increased.

Accordingly, the present invention conforms to the legal requirements owing to its novelty, non-obviousness, and utility. However, the foregoing description is only a preferred embodiment of the present invention, not used to limit the scope and range of the present invention. Those equivalent changes or modifications made according to the shape, structure, feature, or spirit described in the claims of the present invention are included in the appended claims of the present invention.

The invention claimed is:

1. A structure of a supercapacitor, comprising:
    a bottom electrode plate and a top electrode plate, parallel with and stacked on each other, a first rubber frame having a first opening formed therethrough said first rubber frame being adapted atop the bottom electrode plate, a second rubber frame having a second opening formed therethrough said second rubber frame being adapted below the top electrode plate, and the first and the second rubber frames binding with each other, said top and bottom electrode plates in combination with said first and second rubber frames forming an internal chamber;
    an isolation membrane, adapted between the top and the bottom electrode plates, and located in said internal chamber for partially filling said internal chamber and being surrounded by the first and the second rubber frames;
    a liquid electrolyte, filled in the internal chamber and surrounding said isolation member;
    a first resin filling said first and second openings;
    a second resin located around the periphery of said first and second frames and positioned between said top and said bottom electrode plates; and
    a shell covering outside the bottom and the top electrode plates.

2. The structure of a supercapacitor of claim 1, wherein the material of the first rubber frame includes elastic polymer materials.

3. The structure of a supercapacitor of claim 2, wherein the elastic polymer materials include rubber or polybutadiene.

4. The structure of a supercapacitor of claim 1, wherein the material of the second rubber frame includes elastic polymer materials.

5. The structure of a supercapacitor of claim 4, wherein the elastic polymer materials include rubber or polybutadiene.

6. The structure of a supercapacitor of claim 1, wherein the material of the second resin includes hard epoxy resin.

7. The structure of a supercapacitor of claim 1, wherein the material of the shell includes hard epoxy resin.

8. A structure of a supercapacitor, comprising:
    a plurality of electrode plates, parallel with and stacked on each other, and comprising a bottom electrode plate, a plurality of middle electrode plates, and a top electrode plate, first rubber frames having first openings formed therethrough said first rubber frames adapted atop the bottom electrode plate and the plurality of middle electrode plates, second rubber frames having second openings formed therethrough said second rubber frames adapted below the top electrode plate and the plurality of middle electrode plates, and the first and second rubber frames of adjacent electrode plates binding to each other, said top, said bottom and plurality of middle electrode plates in combination with said first and second rubber frames forming internal chambers;

a plurality of isolation membranes, adapted between adjacent electrode plates, and located in said internal chambers for partially filling said internal chambers and being surrounded by the first and the second rubber frames;

liquid electrolytes, filled in the internal chambers and surrounding said isolation members;

first resins filling said first and second openings;

second resins located around the peripheries of said first and second frames and positioned between said top and said bottom electrode plates; and a shell covering outside the bottom and the top electrode plates.

9. The structure of a supercapacitor of claim 8, wherein the material of the first rubber frames includes elastic polymer materials.

10. The structure of a supercapacitor of claim 9, wherein the elastic polymer materials include rubber or polybutadiene.

11. The structure of a supercapacitor of claim 8, wherein the material of the second rubber frames includes elastic polymer materials.

12. The structure of a supercapacitor of claim 11, wherein the elastic polymer materials include rubber or polybutadiene.

13. The structure of a supercapacitor of claim 8, wherein the material of the second resins includes hard epoxy resin.

14. The structure of a supercapacitor of claim 8, wherein the material of the shell includes hard epoxy resin.

* * * * *